(12) United States Patent
Pruitt

(10) Patent No.: US 6,343,619 B1
(45) Date of Patent: Feb. 5, 2002

(54) TWO PIECE SHOWER FAUCET GAUGE

(76) Inventor: Robert Pruitt, 2244 S. Western Ave., Los Angeles, CA (US) 90018

(*) Notice: Subject to any disclaimer, the term of this patent is extended or adjusted under 35 U.S.C. 154(b) by 0 days.

(21) Appl. No.: 09/421,960

(22) Filed: Oct. 20, 1999

Related U.S. Application Data

(63) Continuation-in-part of application No. 29/093,890, filed on Sep. 21, 1998, now abandoned.

(51) Int. Cl.[7] .............................................. F16K 37/00
(52) U.S. Cl. .................................... 137/556.6; 116/277
(58) Field of Search .............................. 137/556, 556.3, 137/556.6; 116/277

(56) References Cited

U.S. PATENT DOCUMENTS

| | | | | |
|---|---|---|---|---|
| 1,054,623 A | * | 2/1913 | Schreidt | 137/556.6 |
| 1,103,917 A | * | 7/1914 | Lawson | 137/556.3 X |
| 2,989,075 A | * | 6/1961 | Johnston | 137/556.6 |
| 3,115,896 A | * | 12/1963 | Roberts et al. | 137/556.6 X |
| 3,913,607 A | * | 10/1975 | Price | 137/556.6 X |
| 3,998,227 A | * | 12/1976 | Holbrook et al. | 137/556.6 X |
| 4,718,445 A | * | 1/1988 | Lundberg et al. | 116/277 X |
| 4,742,848 A | * | 5/1988 | Black | 137/556.3 |
| 5,170,816 A | * | 12/1992 | Schnieders | 137/556.6 |
| 5,393,035 A | * | 2/1995 | Steele | 137/556.6 X |
| 5,487,408 A | * | 1/1996 | Pokhis | 137/556.3 |
| 5,826,617 A | * | 10/1998 | Pokhis | 137/556.3 |
| 6,052,929 A | * | 4/2000 | Canadas | 137/556.3 X |

* cited by examiner

Primary Examiner—John Rivell
(74) Attorney, Agent, or Firm—Hovey, Williams, Timmons & Collins

(57) ABSTRACT

A two part faucet gauge (20), having a gauge strip (22) with strip indicia (24) and a gauge cover (26) with cover indicia (28) is utilized to reduce the time and water wasted in adjusting water to a desired pressure and temperature. The gauge strip (22) includes a raised lip (40), so that it is attached with suction to a faucet support surface (30). The gauge cover (26) preferably comprises a hollow body (44) configured to receive a faucet knob (32) therein. An operator rotates the knob (32) and cover (26) until selected indicia (24,28) from the strip (22) and cover (26) are aligned. The selected indicia (24,28) correspond to the desired pressure and temperature of the water. In an alternate embodiment, the cover (26A) and strip (22A) comprise adhesively backed sheets.

21 Claims, 2 Drawing Sheets

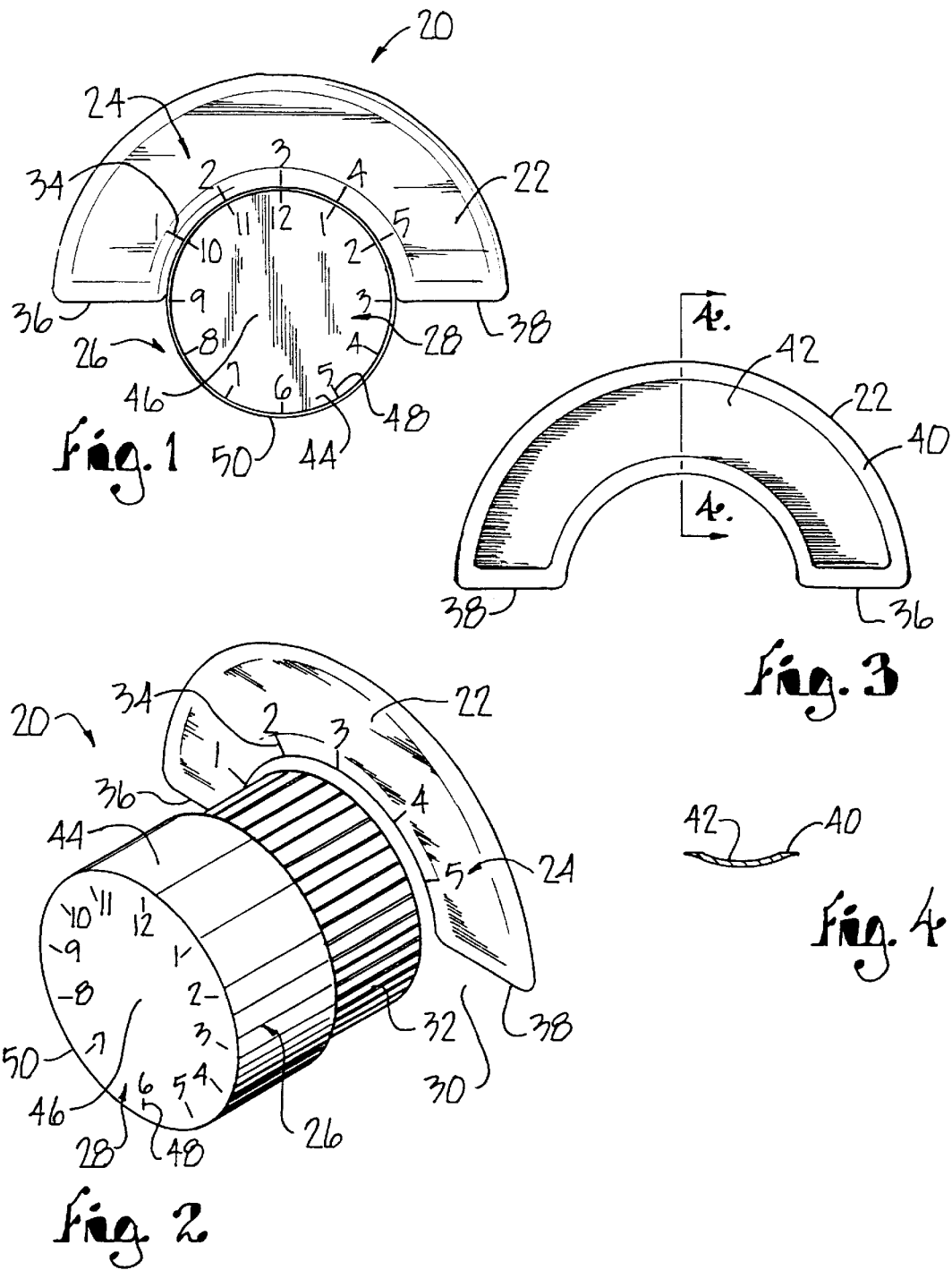

TWO PIECE SHOWER FAUCET GAUGE

RELATED APPLICATIONS

This application is a continuation-in-part of and claims priority on previously filed and U.S. application filed Sep. 21, 1998 and having application Ser. No. 29/093,890 now abandoned.

FIELD OF THE INVENTION

This invention relates to monitoring, control, and regulation devices for water and, more particularly, to water temperature and water pressure control gauges for use with domestic shower faucets.

BACKGROUND OF THE INVENTION

Before an individual begins to take a shower, it is almost always necessary to adjust the pressure and temperature of the water, and while an individual is turning one or two knobs back and forth to achieve the desired water pressure and temperature, both water and time are being wasted. To ameliorate this problem, some faucets are provided with single marks on the knobs, and while a single mark provides some indication of a knob's position, time and water are still wasted because there is no indicia with which to align the single mark. With the average individual spending from three to five minutes adjusting the water temperature and pressure each day, significant amounts of water and time are wasted.

BRIEF SUMMARY OF THE INVENTION

There is, therefore, provided in the practice of the invention a novel shower faucet gauge, which allows an operator to repeatedly select substantially identical water pressure and temperature to reduce the time required for the operator to adjust a shower faucet to the desired water temperature and pressure. The gauge broadly includes a gauge mark positioned on either a faucet knob or a faucet support surface and a set of gauge indicia positioned on the opposite one of the faucet knob and faucet support surface. The one of the gauge mark and indicia on the faucet knob is movable with the faucet knob, and an operator moves the faucet knob until a selected gauge indicia and the gauge mark are aligned. The selected gauge indicia corresponds to the desired pressure and temperature of the water.

In a preferred embodiment, a stationary set of distinguishable indicia is placed on a ring shaped gauge strip positioned generally around and above the faucet knob, and a rotational set of distinguishable indicia is placed on a gauge cover. In one embodiment, the gauge cover is adhered to the knob, and in another embodiment, the gauge cover comprises a hollow body configured to receive the faucet knob therein. The hollow body gauge cover is preferably made from an elastic material, so that it expands to fit over and grips the faucet knob for rotation therewith. The gauge strip includes a raised perimeter lip which removably mounts the strip on the faucet support surface with suction. For knobs that are turned more than once, a turns indicia is provided to remind an operator of the number of turns of the knob prior to aligning the desired indicia.

It is further contemplated that the described faucet gauge is used in combination with a faucet mounted on a faucet support surface. The faucet includes at least one knob having the two piece gauge applied thereto as described.

Accordingly, it is an object of the present invention to provide an improved faucet gauge for reducing the time and water wasted in adjusting water to a desired pressure and temperature.

BRIEF DESCRIPTION OF THE DRAWINGS

These and other inventive features, advantages, and objects will appear from the following Detailed Description when considered in connection with the accompanying drawings in which similar reference characters denote similar elements throughout the several views and wherein:

FIG. 1 is a front elevational view of a two piece shower faucet gauge according to the present invention;

FIG. 2 is a perspective view of the gauge of FIG. 1;

FIG. 3 is a rear elevational view of a gauge strip of the gauge of FIG. 1;

FIG. 4 is transverse cross sectional view of the gauge strip of FIG. 1 taken along line 4—4 in FIG. 3;

DETAILED DESCRIPTION

Figure 5:
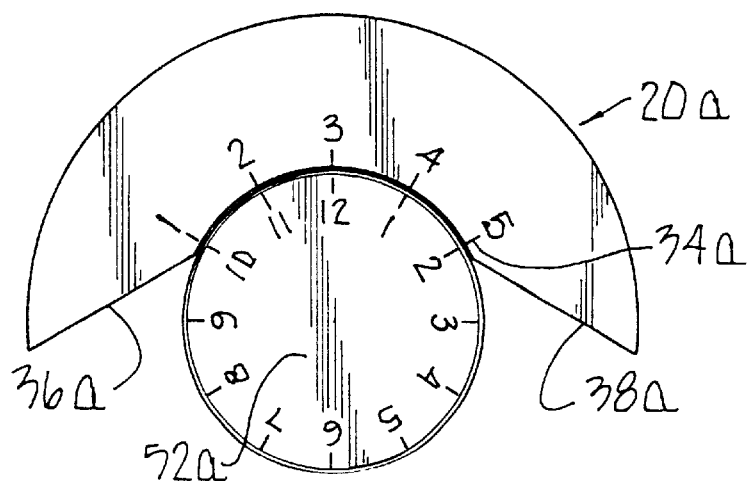
FIG. 5 is a front elevational view of an alternate embodiment of the two piece shower faucet gauge according to the present invention.

Referring to the drawings in greater detail, FIGS. 1 and 2 show a faucet gauge 20 constructed in accordance with a preferred embodiment of the present invention. The gauge 20 broadly includes a gauge strip 22 having strip indicia 24 and a gauge cover 26 having cover indicia 28. The gauge strip 22 is mounted on a faucet support surface 30 to extend around the gauge cover 26, and the gauge cover 26 is mounted on a faucet knob 32 which extends from the faucet support surface 30. To achieve the desired water pressure and temperature, an operator aligns the desired indicia of the strip 22 and cover 26.

The gauge strip 22 is generally ring shaped with substantially constant and concentric inner and outer radii with the strip indicia 24 arcuately arranged and substantially centrally positioned between the inner and outer radii. Strip gauge marks 34 are provided with each indicia and extend radially inward from the strip indicia to the inner radius. If desired, additional strip gauge marks (not shown), which would preferably be evenly spaced apart, are positioned between the gauge marks 34 corresponding to the strip indicia 24. The strip indicia 24 and gauge marks 34 are preferably evenly spaced apart, and the strip indicia 24 preferably comprises uniformly graduated indicia including the distinguishable whole numbers one (1) through five (5). The strip indicia 24 and gauge marks 34 are placed on the strip by, for example, molding, printing, or lamination of a printed media.

Referring to FIGS. 3 and 4, the arcuate strip 22 is a portion of a ring, preferably one-half of a ring, with ends 36, 38 substantially perpendicular to the inner and outer radii. The strip 22 includes a raised perimeter lip 40 extending from the rear surface of the strip so that the center portion 42 of the strip rear surface is recessed. To mount the strip 22, which is preferably elastic, on the faucet support surface 30, the strip is positioned, preferably above the knob 32, and pushed against the surface to flatten the central recess 42. The lip 40 engages the surface 40, and a vacuum is created between the strip 22 and the surface 30. Thus, the strip 22 is attached with suction and removably sticks to the support surface 30, so that the strip 22 is portable. The suction holds the strip 22 substantially stationary, so that the strip indicia 24 comprise a substantially stationary set of distinguishable indicia.

Referring again to FIGS. 1 and 2, the gauge cover 26 comprises a hollow body 44 defining a knob receiving opening through which the faucet knob 32 extends into an internal cavity of the hollow body 44. The hollow body 44 defines a forward face 46 substantially opposite the knob receiving opening. The cover indicia 28 are place on the forward face 46 with cover gauge marks 48. The cover indicia 28 are arranged in a circular pattern around the forward face 46 and adjacent an outer edge 50 of the forward face 46. The gauge marks 48 extend radially outward from the cover indicia toward the outer edge 50. The hollow body 44 is substantially cylindrical to match the configuration of the knob, but the hollow body can be in the form of a bulb, for example, so that it is sized and configured to receive the knob therein. The hollow body is preferably formed from an elastic material, such as rubber, so that it is easily gripped by an operator, can expand to fit over the knob, and then contract to grip the knob for rotation therewith. Thus, the cover indicia 28 are movable with respect to the strip indicia 24 and preferably comprise a rotational set of indicia including the whole numbers one (1) through twelve (12). Thus, the cover indicia 28 is a uniformly graduated and preferably uniformly spaced set of distinguishable indicia.

Broadly, a gauge mark is placed on a selected one of the knob 32 and the faucet support surface 30, and a first set of indicia are placed on the other of the faucet knob 32 and the support surface 30. To accomplish this arrangement in the preferred embodiments, the gauge mark is placed on a selected one of the cover 26 and strip 22, and the set of indicia is placed on the other of the cover 26 and strip 22. Thus, a selected one of the gauge mark and first set of indicia is movable with respect to the other. A second set of indicia are preferably placed on the selected one of the faucet knob 32 and support surface 30 with the gauge mark.

In operation, an operator turns the knob 32 rotating the cover 26 and cover indicia 28 relative to the strip 22 and strip indicia 24. The operator rotates the knob until a selected cover indicia is aligned with a selected strip indicia corresponding to the desired pressure and temperature of the water. If the operator uses a shower at another location, the cover is simply removed and the suction of the strip is released, so that the operator can use the gauge at another location.

Figure 6:
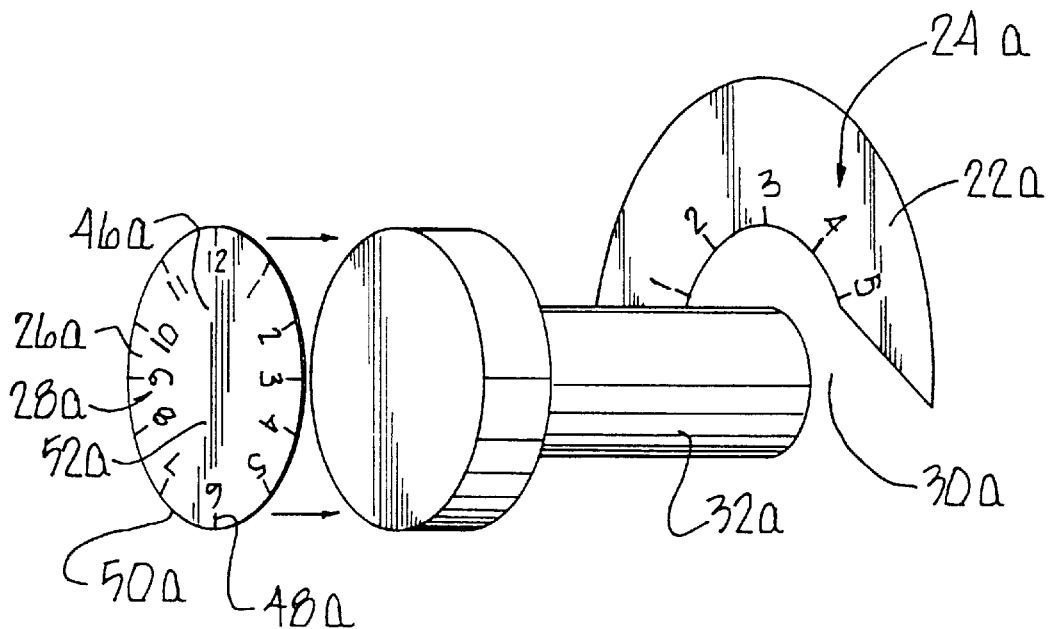
FIG. 6 is a schematic perspective view of the gauge of FIG. 5.

Referring to FIGS. 5 and 6, an alternate embodiment of the gauge 20A will be described using identical reference numerals for related components and features with the components and features of the alternate embodiment being distinguished by the suffix A. The gauge 20A includes a gauge strip 22A and a gauge cover 26A with strip indicia 24A and cover indicia 28A. The gauge strip 22A comprises an adhesive backed sheet for sticking onto the faucet support surface 30A, and the gauge cover 26A comprises an adhesive backed sheet for sticking onto the knob 32A. As illustrated in this alternate embodiment, the ends 36A, 38A of the strip 22A can be beveled to give the strip 22A a crescent shaped appearance.

For faucets which require the knob to be turned more than once before the selected indicia are aligned, a turns indicia 52A is placed on a selected one of the cover and strip. The turns indicia comprises a whole number which is written on the selected gauge component. Alternatively, adhesively backed numbers are provided to stick onto the selected gauge component, or a rotational dial (not shown) is positioned over the turns indicia which are sequentially and circularly arranged. The dial is provided with a single open window which is rotated to the selected turns indicia.

The two part faucet gauge 20 according to the present invention reduces the time and water wasted in adjusting water to a desired pressure and temperature. Further, the gauge reduces the likelihood of injury from scalding hot water.

Thus, a two part faucet gauge is disclosed which utilizes two sets of indicia with relative movement therebetween to quickly and repeatedly turn a faucet knob to a selected rotational position corresponding to a desired water pressure and temperature thereby saving time and water. While preferred embodiments and particular applications of this invention have been shown and described, it is apparent to those skilled in the art that many other modifications and applications of this invention are possible without departing from the inventive concepts herein. For example, a plurality of gauges 20 could be used for faucets with multiple knobs. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. A shower faucet gauge for reducing the time and water wasted in adjusting water to a desired pressure and temperature, the gauge comprising:

a knob cover for placement on a faucet knob having a forward face, said knob cover being placed over the forward face of the faucet knob and presenting a first set of distinguishable indicia;

a second set of distinguishable indicia for placement on a faucet support surface, said first and second sets of distinguishable indica being movable therebetween, the movement bringing a selected indicia from said first set of indicia into alignment with a selected indicia from said second set of indicia resulting in an indicia pair, said indicia pair corresponding to the desired pressure and temperature of the water.

2. The gauge according to claim 1 wherein the second set of distinguishable indicia comprises a uniformly graduated and uniformly spaced second set of distinguishable indicia.

3. The gauge according to claim 1 further comprising an arcuate gauge strip for mounting on the faucet support surface around the faucet knob and including said second set of distinguishable indicia thereon.

4. The gauge according to claim 3 wherein the gauge strip comprises a suction gauge strip operable to removably stick to the faucet support surface.

5. The gauge according to claim 1, wherein said gauge cover comprises a hollow body defining a knob receiving opening for receiving the faucet knob therethrough and into the hollow body, and the body defining a forward face having the first set of distinguishable gauge indicia thereon.

6. The gauge according to claim 1, wherein said gauge cover comprises an adhesive backed sheet for sticking onto the forward face of the faucet knob.

7. The gauge of claim 1, further comprising a turns indicia for placement on at least one of the faucet knob and the faucet support surface.

8. A shower faucet gauge for reducing the time and water wasted in adjusting water to a desired pressure and temperature, the gauge comprising:

a stationary set of distinguishable gauge indicia for placement on a faucet support surface;

a rotational set of distinguishable gauge indicia for placement on the forward face of a faucet knob, rotation of the faucet knob bringing a selected rotational gauge indicia into alignment with a selected stationary gauge indicia, and the selected rotational and stationary gauge indicia corresponding to the desired pressure and temperature of the water.

9. The gauge according to claim 8 further comprising a gauge strip for mounting on the faucet support surface, and the gauge strip having the stationary set of distinguishable indicia thereon.

10. The gauge according to claim 8 further comprising a faucet knob cover for mounting on the faucet knob, and the faucet knob cover having the rotational set of distinguishable gauge indicia thereon.

11. The gauge according to claim 8 further comprising a turns indicia for placement on at least one of the faucet knob and the faucet support surface.

12. The gauge according to claim 8 wherein the rotational and stationary sets of distinguishable gauge indicia comprise uniformly graduated sets of distinguishable gauge indicia.

13. A shower faucet gauge in combination with a faucet mounted on a faucet support surface and having at least one faucet knob for reducing the time and water wasted in adjusting water to a desired pressure and temperature, the gauge comprising:

a stationary set of distinguishable gauge indicia;

a rotational set of distinguishable gauge indicia;

a gauge strip mounted on the faucet support surface in a substantially stationary position, and the gauge strip having the stationary set of distinguishable indicia thereon;

a faucet knob cover mounted on the faucet knob for rotation with the faucet knob, and the faucet knob cover having the rotational set of distinguishable gauge indicia thereon, rotation of the faucet knob bringing a selected rotational gauge indicia into alignment with a selected stationary gauge indicia, and the selected rotational and stationary gauge indicia corresponding to the desired pressure and temperature of the water.

14. The combination according to claim 13 wherein the faucet cover comprises a hollow body having the faucet knob received therein, and the hollow body defining a forward face having the rotational set of indicia on the forward face.

15. The combination according to claim 13 wherein the faucet cover comprises an elastic hollow body configured to receive the faucet knob therein.

16. The combination according to claim 13 wherein the gauge strip comprises a substantially constant radius and a raised perimeter lip mounting the gauge strip on the faucet support surface with suction.

17. The combination according to claim 13 wherein the gauge strip comprises a portion of a ring and is positioned above the faucet knob.

18. The gauge of claim 13, further comprising a turns indicia for placement on at least one of the faucet knob and the faucet support surface.

19. A shower faucet gauge for reducing the time and water wasted in adjusting water to a desired pressure and temperature, the gauge comprising:

a gauge mark for placement on a selected one of a faucet knob and a faucet support surface;

a set of distinguishable gauge indicia for placement on another of the faucet knob and the faucet support surface in close proximity to the gauge mark; a selected one of the gauge mark and set of gauge indicia being movable with respect to another of the gauge mark and set of gauge indicia; the movement bringing a selected gauge indicia into alignment with the gauge mark, and the selected gauge indicia corresponding to the desired pressure and temperature of the water; and an arcuate gauge strip for mounting on the faucet support surface around the faucet knob and including one of the gauge mark and the set of distinguishable gauge indicia thereon, said gauge strip comprising a suction gauge strip operable to removably stick to the faucet support surface.

20. A shower faucet gauge for reducing the time and water wasted in adjusting water to a desired pressure and temperature, the gauge comprising:

a gauge mark for placement on a selected one of a faucet knob and a faucet support surface;

a gauge cover for mounting on the faucet knob and including one of the gauge mark and the set of distinguishable gauge indicia; and a set of distinguishable gauge indicia for placement on another of the faucet knob and the faucet support surface in close proximity to the gauge mark; a selected one of the gauge mark and set of gauge indicia being movable with respect to another of the gauge mark and set of gauge indicia; the movement bringing a selected gauge indicia into alignment with the gauge mark, and the selected gauge indicia corresponding to the desired pressure and temperature of the water.

21. The gauge according to claim 20, wherein said gauge cover comprises a hollow body defining a knob receiving opening for receiving the faucet knob therethrough and into the hollow body, and the body defining a forward face having the one of the gauge mark and the set of distinguishable gauge indicia thereon.

* * * * *